A. L. MILLER & W. W. BURDETTE.
BRAKE FOR RAILWAY CARS.
APPLICATION FILED DEC. 5, 1912.
1,072,757.     Patented Sept. 9, 1913.
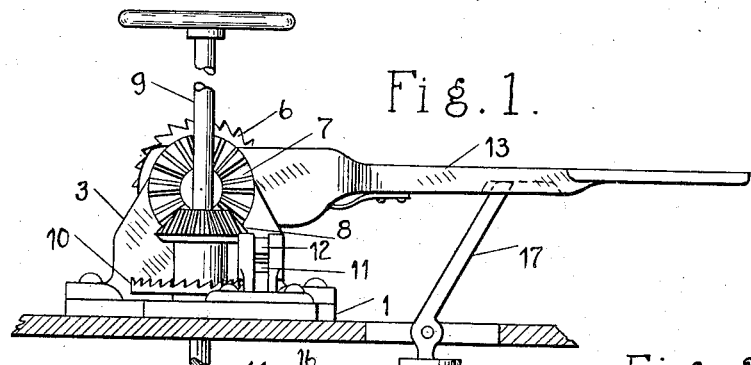
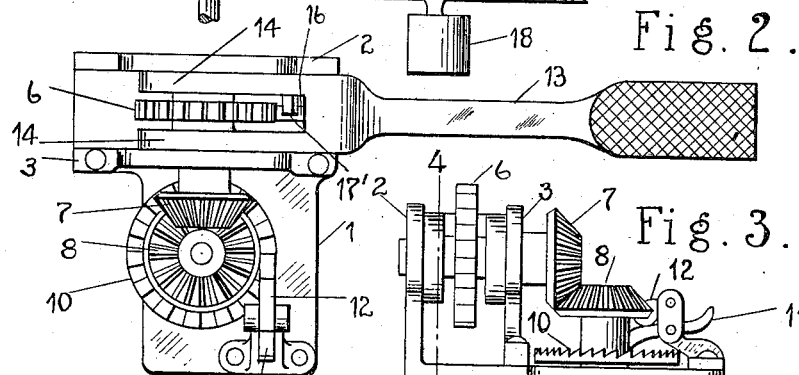
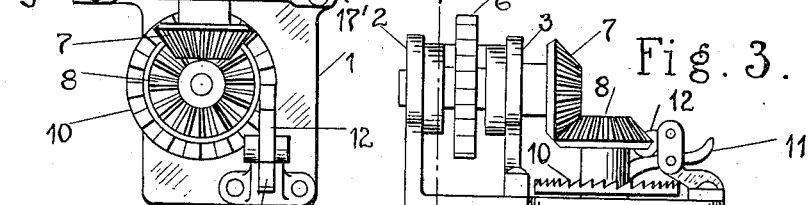
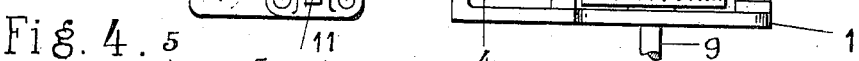
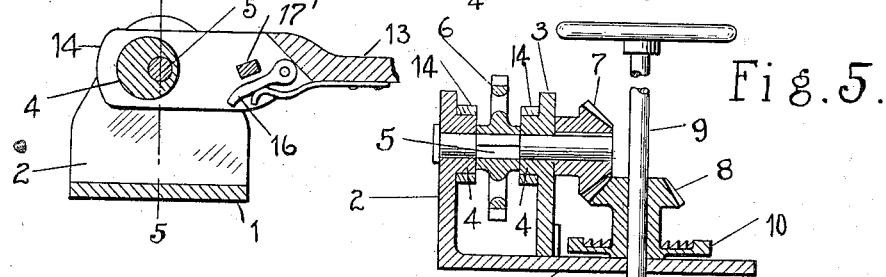
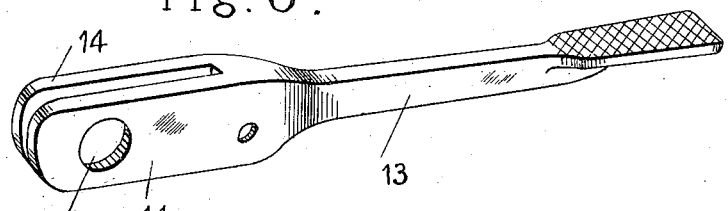
Witnesses
M. S. Watson
Inventors
A. L. Miller
Wm W Burdette
By Chandler & Chandler
Attorneys

UNITED STATES PATENT OFFICE.

ADAM L. MILLER AND WILLIAM W. BURDETTE, OF HANDLEY, WEST VIRGINIA.

BRAKE FOR RAILWAY-CARS.

1,072,757. Specification of Letters Patent. Patented Sept. 9, 1913.

Application filed December 5, 1912. Serial No. 735,140.

*To all whom it may concern:*

Be it known that we, ADAM L. MILLER and WILLIAM W. BURDETTE, citizens of the United States, residing at Handley, in the county of Kanawha, State of West Virginia, have invented certain new and useful Improvements in Brakes for Railway-Cars; and we do hereby declare the following to be a full, clear, and exact description of the invention, such as will enable others skilled in the art to which it appertains to make and use the same.

This invention is directed to improvements in brakes for railway cars, and has for its object to so construct a device of this character that it may be conveniently applied to the brake shaft now in use.

A further object of the invention is to so construct a device of this character that the same may be applied by the foot, thus assuring a greater braking leverage than heretofore accomplished by the hand wheel operated brake.

With these and other objects in view, this invention resides in the novel features of construction, formation, combinations and arrangements of parts to be hereinafter more fully described, claimed and illustrated in the accompanying drawing, in which:—

Figure 1 is a side elevation of the device. Fig. 2 is a top plan view. Fig. 3 is an end view. Fig. 4 is a sectional view on line 4—4 of Fig. 3. Fig. 5 is a similar view on line 5—5 of Fig. 4. Fig. 6 is a detail perspective view of the foot lever.

Referring to the drawing, the numeral 1 designates a plate which may be mounted upon the top of a freight car or upon the platform of a day coach. One end of the plate terminates in a vertical bracket 2, a similar bracket 3 being bolted to the plate 1 and spaced from the bracket 2, said brackets having their confronting faces provided with eccentric bearings 4. Rotatably mounted in the bearings 4 is a shaft 5, said shaft having fixed thereto a ratchet wheel 6, the purpose of which will appear later. Keyed to one end of the shaft 5 is a beveled gear 7, the same being in mesh with a similar gear 8, said gear being fixed to the brake shaft 9. The beveled gear 8 has formed integral therewith an annular ratchet surface 10 which is adapted to be engaged by the pawl 11, said pawl being held normally in engagement with the ratchet surface 10 by a pivotally mounted weight 12, said pawl serving to hold the brake shaft 9 in its applied position upon operation of the device. A foot lever 13 is provided and has one end provided with furcations 14, the same being adapted to span the ratchet wheel 6 so that the perforations 15 engage the eccentric bearings 4. A spring pressed pawl 16 is connected to the lever so that the same will successively engage the teeth of the ratchet wheel 6 and impart rotary movement thereto when pressure is applied to the lever 13, thus imparting similar movement through the medium of the beveled gears 7 and 8 to the shaft 9 which action applies the brakes to the wheels.

To normally hold the foot lever 13 in its raised position, an arm 17 is provided, said arm being pivotally connected to the top or platform of the car as the occasion may be, said arm having its upper end bearing against the under surface of the lever and its lower end provided with a weight 18. Thus it will be seen that when pressure is applied to the lever the arm 17 will be rocked and as soon as pressure is relieved the weight 18 will cause the arm 17 to rock in an opposite direction thus moving the foot lever upwardly.

By eccentrically mounting the lever 13 the same may be swung in a direction so that the pawl 16 will disengage the teeth of the ratchet wheel 6, thus rendering the brake free. A stop 17′ is carried by one of the furcations 14 of the lever, and serves to limit the swinging movement of the pawl 16 in one direction, whereby said pawl will be in a proper position to successively engage the teeth of the ratchet 6 when the device is in its operative position.

What is claimed is:—

1. A brake of the class described comprising in combination a plate, brackets carried by the plate, eccentric bearings formed upon the brackets, a shaft journaled in the bearings, a ratchet wheel fixed to the shaft, a brake shaft, beveled gears connecting said shafts, a lever having one end supported by the eccentric bearings, a pawl carried by the lever for engaging the ratchet wheel, a weighted arm engaging said lever, as and for the purpose set forth.

2. A brake of the class described comprising a plate, brackets mounted on the plate, eccentric bearings formed upon the opposing faces of the brackets, a shaft rotatably mounted in the bearings, a ratchet wheel fixed to the shaft and between the brackets, a beveled gearing fixed to one end of the shaft, a brake shaft, a similar gear fixed to the brake shaft and in mesh with the first named gear, a foot lever having one end provided with furcations, said furcations having perforations formed therein for engaging the eccentric bearings, an arm having its upper end bearing against the foot lever, and its lower end provided with a weight, a pawl carried by the lever and adapted to engage the ratchet wheel when the lever is forced downwardly, said arm being adapted to force the lever upwardly when pressure is relieved thereon.

In testimony whereof, we affix our signatures in the presence of two witnesses.

ADAM L. MILLER.
WILLIAM W. BURDETTE.

Witnesses:
EMMET W. BLEVINS,
G. E. M. LAUGHLIN.

Copies of this patent may be obtained for five cents each, by addressing the "Commissioner of Patents, Washington, D. C."